US008451840B2

(12) United States Patent
Bosch et al.

(10) Patent No.: US 8,451,840 B2
(45) Date of Patent: May 28, 2013

(54) MOBILITY IN IP WITHOUT MOBILE IP

(75) Inventors: Peter Bosch, Aalsmeer (NL); Sape J. Mullender, Berchem (BE); Peter Schefczik, Erlangen (DE)

(73) Assignee: Alcatel Lucent, Paris (FR)

( * ) Notice: Subject to any disclaimer, the term of this patent is extended or adjusted under 35 U.S.C. 154(b) by 751 days.

(21) Appl. No.: 12/612,293

(22) Filed: Nov. 4, 2009

(65) Prior Publication Data

US 2010/0135301 A1 Jun. 3, 2010

Related U.S. Application Data

(60) Provisional application No. 61/118,772, filed on Dec. 1, 2008.

(51) Int. Cl.
*H04L 12/28* (2006.01)
*H04L 12/56* (2006.01)

(52) U.S. Cl.
USPC ............... 370/392; 370/395.31; 370/410

(58) Field of Classification Search
None
See application file for complete search history.

(56) References Cited

U.S. PATENT DOCUMENTS

| 6,609,198 | B1 * | 8/2003 | Wood et al. ............... 713/155 |
|---|---|---|---|
| 7,215,772 | B2 * | 5/2007 | Short ............................ 380/44 |
| 7,493,652 | B2 * | 2/2009 | Aura ............................. 726/2 |
| 7,877,503 | B2 * | 1/2011 | Solis et al. ................... 709/232 |
| 2003/0228868 | A1 * | 12/2003 | Turanyi et al. ............ 455/432.1 |
| 2004/0215794 | A1 * | 10/2004 | Lauer .......................... 709/230 |
| 2008/0002684 | A1 * | 1/2008 | Kumazawa et al. ........ 370/389 |
| 2010/0217876 | A1 * | 8/2010 | Fikouras et al. ............ 709/228 |

* cited by examiner

*Primary Examiner* — Faruk Hamza
*Assistant Examiner* — Cassandra Decker
(74) *Attorney, Agent, or Firm* — Mendelsohn, Drucker, & Associates, P.C.; Edward Meisarosh; Steve Mendelsohn

(57) ABSTRACT

Not Mobile IP (NMIP) comprises methods for implementing macro-mobility in an IP network, wherein macro-mobility means the ability of a node to change its network-layer, e.g., IP, address without disturbing existing transport-layer and application-layer sessions, e.g., conversations. When two NMIP nodes establish a new NMIP session, they exchange pseudo-random numbers, or nonces, and store the nonces in a session table. When a first node changes its IP address, the first node sends to the second node an address-update message that contains the new IP address and the first node's nonce. If the received nonce matches a nonce in the session table, then the second node updates its protocol control blocks with the new IP address, and sends an address-update reply message to the first node. Internet Protocol Security (IPsec) can be used to secure or replace the exchange of nonces.

15 Claims, 6 Drawing Sheets

MOBILITY IN IP WITHOUT MOBILE IP

This application claims the benefit of the filing date of U.S. provisional application Ser. No. 61/118,772 filed on Dec. 1, 2008, the teachings of which are incorporated herein by reference in their entirety.

BACKGROUND OF THE INVENTION

1. Field of the Invention

The invention relates to network communications, and more specifically to the Internet Protocol (IP).

2. Description of the Related Art

In recent years, there has been a growing demand for IP-enabled devices that can maintain transport-layer and application-layer sessions despite changes in network-layer sessions, which ability is known as macro-mobility. For example, if two IP nodes have an established transport-layer session and an established application-layer session, then either node should be able to change its IP address (a network-layer change) without interrupting either that transport-layer session or that application-layer session.

SUMMARY OF THE INVENTION

In one embodiment, the present invention is a first node for a packet-switched network having a protocol stack comprising an upper layer and a lower layer. The first node comprises (i) a transceiver adapted to receive incoming packets and transmit outgoing packets and (ii) a processor adapted to process the incoming packets and generate the outgoing packets. The first node is adapted to establish an upper-layer session with a second node in which packets are transmitted between the first node and the second node via the packet-switched network during which the first node has a first lower-layer address. The first node is adapted to switch from the first lower-layer address to a second lower-layer address, different from the first lower-layer address, while maintaining the upper-layer session. The first node has no home lower-layer address.

In another embodiment, the present invention is a first node for a packet-switched network having a protocol stack comprising an upper layer and a lower layer. The first node comprises (i) a transceiver adapted to receive incoming packets and transmit outgoing packets and (ii) a processor adapted to process the incoming packets and generate the outgoing packets. The first node is adapted to receive, from a second node, (i) a current lower-layer address of the second node and (ii) an identifier for the second node. If the first node does not have an existing association between the second node's identifier and any lower-layer address of the second node, then the first node (i) associates the second node's identifier with the current lower-layer address of the second node and (ii) establishes an upper-layer session with the second node, wherein packets transmitted by the first node to the second node are addressed to the current lower-layer address for the second node. If the first node does have an existing association between the second node's identifier and a previous lower-layer address of the second node, different from the current lower-layer address of the second node, then the first node (i) updates the existing association such that the second node's identifier is associated with the current lower-layer address of the second node and (ii) addresses packets to be transmitted to the second node with the current lower-layer address of the second node.

In yet another embodiment, the present invention is a router for a packet-switched network having a protocol stack comprising an upper layer and a lower layer. The router comprises (i) a transceiver adapted to receive incoming packets and transmit outgoing packets and (ii) a processor adapted to process the incoming packets and generate the outgoing packets. The router is adapted to support an upper-layer session between a first node and a second node in which packets are transmitted between the first node and the second node via the packet-switched network. The first node is adapted to establish the upper-layer session with the second node during which the first node has a first lower-layer address. The first node is adapted to switch from the first lower-layer address to a second lower-layer address, different from the first lower-layer address, while maintaining the upper-layer session with the second node. The first node has no home lower-layer address.

In still another embodiment, the present invention is a packet-switched network having a protocol stack comprising an upper layer and a lower layer. The packet-switched network comprises two or more routers, wherein the packet-switched network enables a first node, having a first lower-layer address, but without a home lower-layer address, to (i) have an upper-layer session with a second node using the first lower-layer address and (ii) switch from the first lower-layer address to a second lower-layer address, different from the first lower-layer address, without terminating the upper-layer session.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Figure 1:
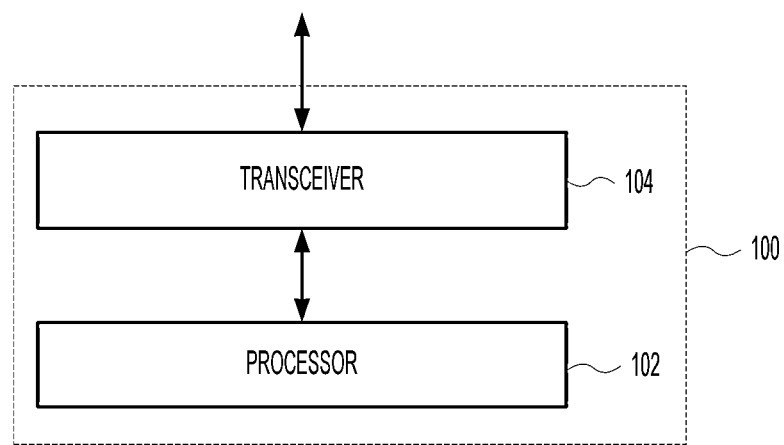
FIG. 1 is a simplified block diagram of typical node 100 for a communications network.

A communications network comprises two or more nodes and the physical link(s) between the nodes. On a packet-switched communications network, e.g., the Internet, communications are in the form of discrete units of information known as packets. A typical communication on the Internet is between two endpoint nodes generating and sending packets to each other via one or more links and zero, one, or more intermediate nodes FIG. 1 is a simplified block diagram of typical node 100 for a communications network. Node 100 comprises processor 102 and transceiver 104. Processor 102 processes signals received by transceiver 104 from one or more other nodes in the communications network and generates signals to be transmitted by transceiver 104 to one or more other nodes in the communications network. Transceiver 104 communicates with one or more other nodes over one or more physical links, e.g., copper wire, optical fiber, or air (i.e., wireless).

The Internet is a digital packet-switched network that uses the four-layer Internet Procotol suite for the generation and processing of packets. The Internet Protocol suite (IP suite) is defined in Internet Engineering Task Force (IETF) Request for Comment (RFC) 1122, which is hereby incorporated by reference in its entirety. The lowest layer of the IP suite is the link layer (e.g., Ethernet), followed by the network layer (e.g., Internet Protocol (IP)), the transport layer (e.g., Transport Control Procotol (TCP)), and, highest, the application layer (e.g., Simple Mail Transport Protocol (SMTP) or Hypertext Transfer Protocol (HTTP)). The term "session" refers to a communication between two nodes at a particular layer, e.g., a link-layer session or a transport session. The term "conversation" refers to a transport-layer session or an application-layer session or a combined transport/application layer session. The two nodes in a conversation are referred to as correspondent nodes.

The establishment of a session at a particular layer requires that all lower layers have established a session. For example, establishing a conversation requires sessions to be established at the transport, network, and link layers. Conversely, terminating a session at a particular layer typically terminates all sessions at higher layers, e.g., terminating an IP session (network layer) typically terminates transport-layer sessions and application-layer sessions (i.e., conversations).

A typical node connects to the Internet via an access network. A typical access network comprises a router that manages an IP-address range also known as a subnet. A router is a network node that retransmits received packets towards one or more other network nodes. An exemplary subnet address range for a residential router is 192.168.1.x. A node connects to the Internet by first establishing a link-layer (e.g., Ethernet) connection with the access-network router. Typically, the router then assigns the next available address from the subnet to the node, e.g., 192.168.1.3. The node then can establish transport-layer sessions and conversations with other nodes on the Internet.

Moving a node within an access network typically does not terminate the node's conversations. If a node changes its link-layer point of attachment (POA) within an access network, then the link-layer address of the node will change. For example, if a node moves from a POA of port A on a router to a new POA of port B on the same router, then the link-layer address of the node will change from the MAC (media access control) address of port A to the MAC address of port B. Theoretically, such a move would terminate the link-layer session on port A, and thus terminate all higher-level sessions, including any conversations. However, link-layer protocols, such as the Address Resolution Protocol (ARP), allow a node to change its link-layer address without disturbing higher-level protocols. In other words, a typical node is able to change its link-layer session without disturbing its network-layer, transport-layer, or application-layer sessions. This ability is known as micro-mobility.

Macro-mobility is the ability to change a network-layer session without disturbing transport-layer and application-layer sessions. The most common network-layer protocol in use today, IP version 4 (IPv4), does not provide macro-mobility. IPv4 is defined in IETF RFC 791, which is hereby incorporated by reference in its entirety. Thus, when the network-layer session on an IPv4 node is interrupted, all of the node's conversations are terminated.

For example, when an IPv4 mobile node moves from one access network to another, the mobile node moves between IP subnets, i.e., IP address ranges. Thus, the IPv4 mobile node typically must discard its current network-layer, e.g., IP, address, and acquire a new IP address from the address range managed by the new access network. Changing IP addresses interrupts the network-layer session and terminates all conversations. An IPv4 node's only option when changing IP addresses is to re-establish terminated conversations with correspondent nodes, a time-consuming and cumbersome process.

There have been several responses to the lack of macro-mobility in IPv4. One of the responses is for the application-layer applications themselves to re-establish conversations with correspondent nodes, also known as application-layer mobility. Application-layer mobility must be integrated into each specific application by the application's designer. As such, application-layer mobility is an inefficient and incomplete macro-mobility solution when compared to network-layer macro-mobility. Application-layer mobility is inefficient because each application designer must design and integrate application-layer mobility into their applications, while macro-mobility support at the network layer would eliminate this duplicative effort. Application-layer mobility is incomplete because there is no guarantee that all application designers will integrate macro-mobility into their applications. Therefore, there is always the possibility of applications that will require manual re-establishment of a communications session when a mobile node moves from one access point to another. Again, macro-mobility support at the network layer would render this problem moot.

Mobile IP (MIP)

Another response to the lack of macro-mobility in IPv4 has been new network-layer protocols that support macro-mobility. One class of the new network-layer protocols is referred to as Mobile IP (MIP). MIP protocols include Mobility Support in IP version 4 (MIPv4), defined in IETF RFC 3344, which is hereby incorporated by reference in its entirety, and Mobility Support in IP version 6 (MIPv6), which is defined in IETF RFCs 3775 and 4866, which are hereby incorporated by reference in their entirety. MIPv6 includes most of the features of MIPv4 and adds some additional functionality. Thus, the following discussion will focus on MIPv6.

Figure 2:
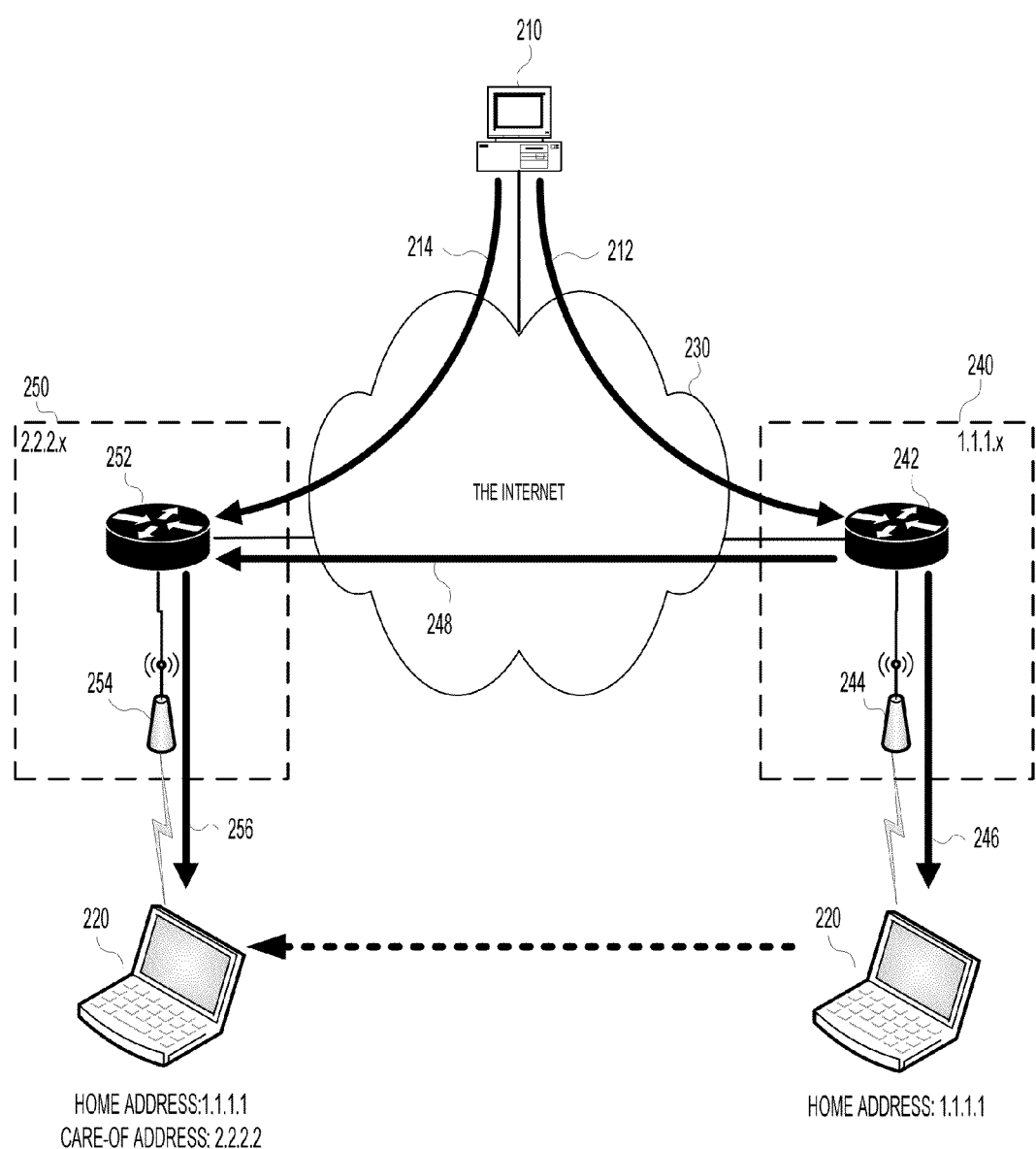
FIG. 2 is a depiction of Mobility Support in Internet Protocol version 6 (MIPv6) network 200.

FIG. 2 is a depiction of Mobility Support in Internet Protocol version 6 (MIPv6) network 200. Network 200 comprises correspondent nodes 210 and 220, Internet 230, and access networks 240 and 250. Access network 240 comprises a router 242 and wireless access point 244, and access network 250 comprises a router 252 and wireless access point 254. Router 242 is connected to wireless access point 244, and router 252 is connected to wireless access point 254. Router 242 manages subnet 1.1.1.x, and router 252 manages subnet 2.2.2.x. Node 210, router 240, and router 250 connect to the Internet.

Node 220 is initially connected to the Internet via wireless access point 244 and router 242. Wireless access point 244 is exemplary, and node 220 can connect to router 242 via a copper-wire hub or switch, or connect directly to a fiber-optic port on router 242 with a fiber-optic cable. Node 220 has an IP home address of 1.1.1.1.

In MIP, a node has a permanent association with a particular access network, known as the home network, and the node permanently retains its home-network IP address, known as the home address. The router managing the home network is known as the home agent. In FIG. 2, access network 240 is the home network for node 220, router 242 is the home agent of node 220, and IP address 1.1.1.1 is node 220's home address.

While node 220 is attached to its home network, MIP behaves like traditional IP (e.g., IPv4) with regards to the routing of packets. During a conversation between node 220 and node 210, node 210 transmits packets with a destination IP address of 1.1.1.1, which packets transit the Internet via route 212 to the home agent. The home agent routes the packets via route 246 to node 220.

Assume that node 220 moves from home network 240 to access network 250, i.e., node 220 is a mobile node. In the process, the mobile node acquires second IP address 2.2.2.2 from router 252. In the terminology of MIP, access network 250 is a foreign network, router 252 is a foreign agent for mobile node 220, and IP address 2.2.2.2 is mobile node 220's care-of address. Typically, a node is associated with only one foreign network at a time. Thus, if node 220 were to move to a third access network, then the node would retain its home address of 1.1.1.1, but discard care-of address 2.2.2.2 for a new care-of address in the third access network.

Both MIPv4 and MIPv6 provide macro-mobility through triangular routing. Specifically, upon receiving a new care-of address, mobile node 220 sends a binding-update message to home agent 242, which message instructs home agent 242 to route any packets destined for IP address 1.1.1.1 to IP address 2.2.2.2. Node 210 continues to address packets destined for mobile node 220 with the destination IP address 1.1.1.1, and those packets are still received by home agent 242. The home agent encapsulates the received packets in another packet with care-of IP address 2.2.2.2, which encapsulation is also known as tunneling. The encapsulated packets transit the Internet via route 248 to foreign agent 252. Foreign agent 252 routes the packets via route 256 to mobile node 220. Mobile node 220 de-encapsulates the inner packet, and delivers the inner packet, addressed to the mobile node's home address of 1.1.1.1, to itself.

Triangular routing has a number of disadvantages, such as increased complexity, increased packet overhead, and exclusion of more-efficient routes. As an example of the last disadvantage, consider the scenario where node 210 is attached to Internet via access network 250. Even after mobile node 220 moves to access network 250, node 210 will still send packets to home agent 242, which home agent will tunnel those packets back to foreign agent 252.

MIPv6 addresses the disadvantages of triangular routing with a procedure called route optimization. In route optimization, a mobile correspondent node sends a binding-update message containing the mobile node's new care-of address to the other correspondent node. The other correspondent node updates its binding for the mobile node with the new care-of address. The other correspondent node then sends packets directly to the mobile node's care-of address, rather than through the mobile node's home agent, thus eliminating tunneling and triangular routing.

However, route optimization represents a significant security threat. Specifically, an adversary can impersonate a mobile node and use the route-optimization procedure to re-direct packets bound for the mobile node to another location. For example, node A at IP address 3.3.3.3 and node B at IP address 4.4.4.4 are in a conversation. Adversary C at IP address 5.5.5.5 sends a binding-update message to node B stating, incorrectly, that node A's new care-of address is 5.5.5.5. Node B will now send all packets destined for node A to node C. This process is known as hijacking a conversation.

To guard against this possibility, the route-optimization procedure first performs a return-routability test wherein the other correspondent node sends messages to both the mobile node's home address and care-of address in order to authenticate the mobile node. Route optimization makes it more difficult for an adversary to hijack a conversation. However, route optimization is an elaborate procedure that typically is performed every time a mobile node acquires a new IP address. Furthermore, a mobile node must perform a separate route optimization routine for every other correspondent node with which the mobile node is in a conversation. Yet further, even when a mobile node on a foreign network is not moving, security concerns dictate that return-routability tests, for each other correspondent node, be performed at regular, short intervals (the default is once every seven minutes). Especially when frequent moves are expected, e.g., in cellular systems, route optimization consumes significant resources and increases latency.

Furthermore, although route optimization eliminates most of the tunneling and triangular routing of MIP, MIPv6 does not do away with the home agent. As a mobile node moves from visited network to visited network, the mobile node will need to repeatedly perform the return-routability procedure which, in turn, still requires a home agent. Since a home agent might be supporting hundreds if not thousands of mobile nodes, the home agent represents a significant possible point of failure.

Host Identity Protocol

A non-MIP-based IP macro-mobility solution is the Host Identity Protocol (HIP). HIP is defined in IETF RFC 4423, which is incorporated herein by reference in its entirety. In HIP, a new layer is added between the transport and IP layers. The new layer identifies a host by a Host Identifier (HI) public key and a 128-bit cryptographic hash, the Host Identifier Tag (HIT), generated from the public key. Domain Name Service (DNS) resolves a Fully Qualified Domain Name (FQDN) into an HI public key, and the generated HIT is then inserted into an IPv6 packet. When a packet is submitted for transmission, the HIP layer translates the HI/HIT into a pure IP address. Using the HI/HIT before establishing a communications session is a good step in providing secure communication within IP networks, and a HIP-initiated session can be used to establish an Internet Protocol Security/Encapsulation Security Protocol (IPsec/ESP, RFC 2406) tunnel between the correspondent nodes.

Mobility in HIP is implemented by HIP clients exchanging address-update messages with their correspondent nodes over an IPsec/ESP tunnel at the HIP layer. By using IPsec/ESP, the update messages are integrity protected. HIP does require a reachability test like Mobile IPv6's route-optimization procedure. In HIP, the mapping between an HI public key and an IP address can be stored in either a DNS or a rendezvous server. This means that, when a cellular terminal obtains a new IP address, it must also update these name servers. RFC 4423 does not specify yet how a correspondent node selects between the various types of name servers.

A disadvantage of HIP is that it is not backwards compatible with existing IP networks, and there does not appear to be any way to introduce it in a backwards-compatible way.

Not Mobile IP

There is a need for an IP macro-mobility solution that (i) eliminates the need for permanent home agents and permanent home addresses, (ii) avoids tunneling/triangular routing and establishes direct routes between correspondent nodes whenever possible, as soon as possible, (iii) is secure, i.e., that prevents adversaries from hijacking a conversation, and (iv) is backwards compatible.

Embodiments of the present invention are referred to herein as Not Mobile IP (NMIP) to distinguish them from Mobile IP. NMIP comprises a set of extensions to the IP protocol that provide secure macro-mobility to IP-enabled nodes without the use of permanent home agents, return-routability tests, or extensive tunneling/triangular routing. An NMIP network therefore more closely resembles a traditional IP network, where state is maintained only at the endpoints, i.e., the correspondent nodes.

NMIP Network

NMIP does not assign a permanent home address to a node. Instead, a typical NMIP node possesses only one IP address: the IP address assigned to the node by the access network to which the node is currently attached. When a node possessing a first IP address moves from a first access network to a second, the node acquires a second IP address from the second network, and may retain the first IP address for a time period just long enough to receive any in-transition packets that were sent during the move. Once the time period expires, the first IP address is discarded. Without home addresses, there is no need in NMIP for home networks or home agents. Alternatively, in-transition packets to the first IP address may be forwarded to the second IP address by an agent in the first access network. Another alternative is that in-transition packets are not delivered and will be lost. A mechanism in a higher-level protocol may then be invoked to retransmit the lost packets to the second IP address.

Thus, while an NMIP network is analogous to the MIP network depicted in FIG. 2, the functions and names of certain elements have changed. Without a concept of "home," NMIP has no concept of "foreign" or "care-of." Instead, in NMIP, there is a current access network to which a node is currently attached and a previous access network to which the node was attached immediately prior to the current access network. Thus, if FIG. 2 represents NMIP network 200 after node 220 has moved from access network 240 to access network 250, then access network 250 is the current access network, and access network 240 is the previous access network. If node 220 were then to move back to access network 240, the designations of previous access network and current access network would switch.

Instead of home agent and foreign agent, there is a current mobility router and a previous mobility router. Thus, in FIG. 2, if node 220 moves from access network 240 to access network 250, then router 242 is the previous mobility router, and router 252 is the current mobility router.

NMIP-Node States

Figure 3:
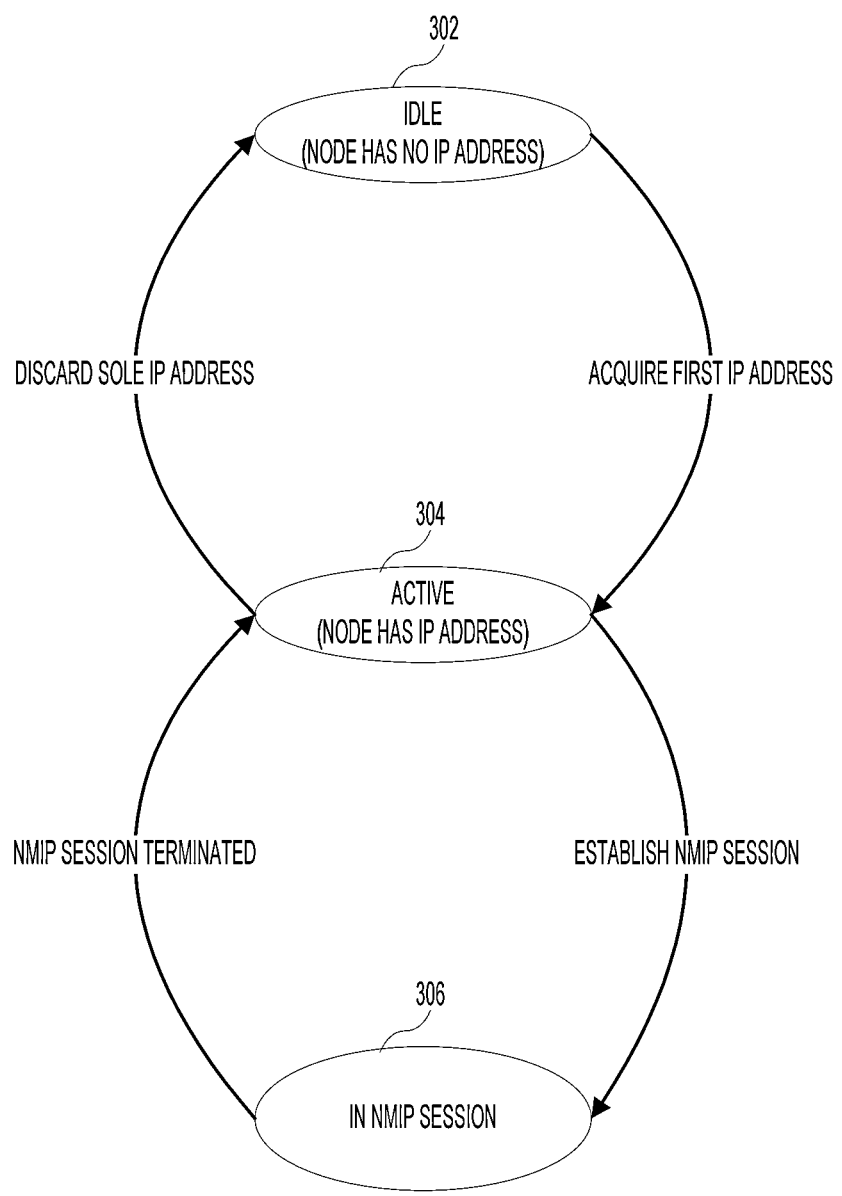
FIG. 3 is a top-level state diagram of a Not Mobile IP (NMIP) node, according to one embodiment of the present invention.

FIG. 3 is a top-level state diagram of a Not Mobile IP (NMIP) node, according to one embodiment of the present invention. The node starts in the IDLE state 302, wherein the node is powered on, but has no IP address. The node changes from the IDLE state to the ACTIVE state 304 when the node acquires a first IP address. The node changes from the ACTIVE state to the IN NMIP SESSION state 306 when the node establishes an NMIP session with another NMIP node. The node changes from the IN NMIP SESSION state to the ACTIVE state when NMIP session is terminated. The node changes from the ACTIVE state to the IDLE state when the node discards its sole IP address or the sole IP address expires.

NMIP Session

Figure 4:
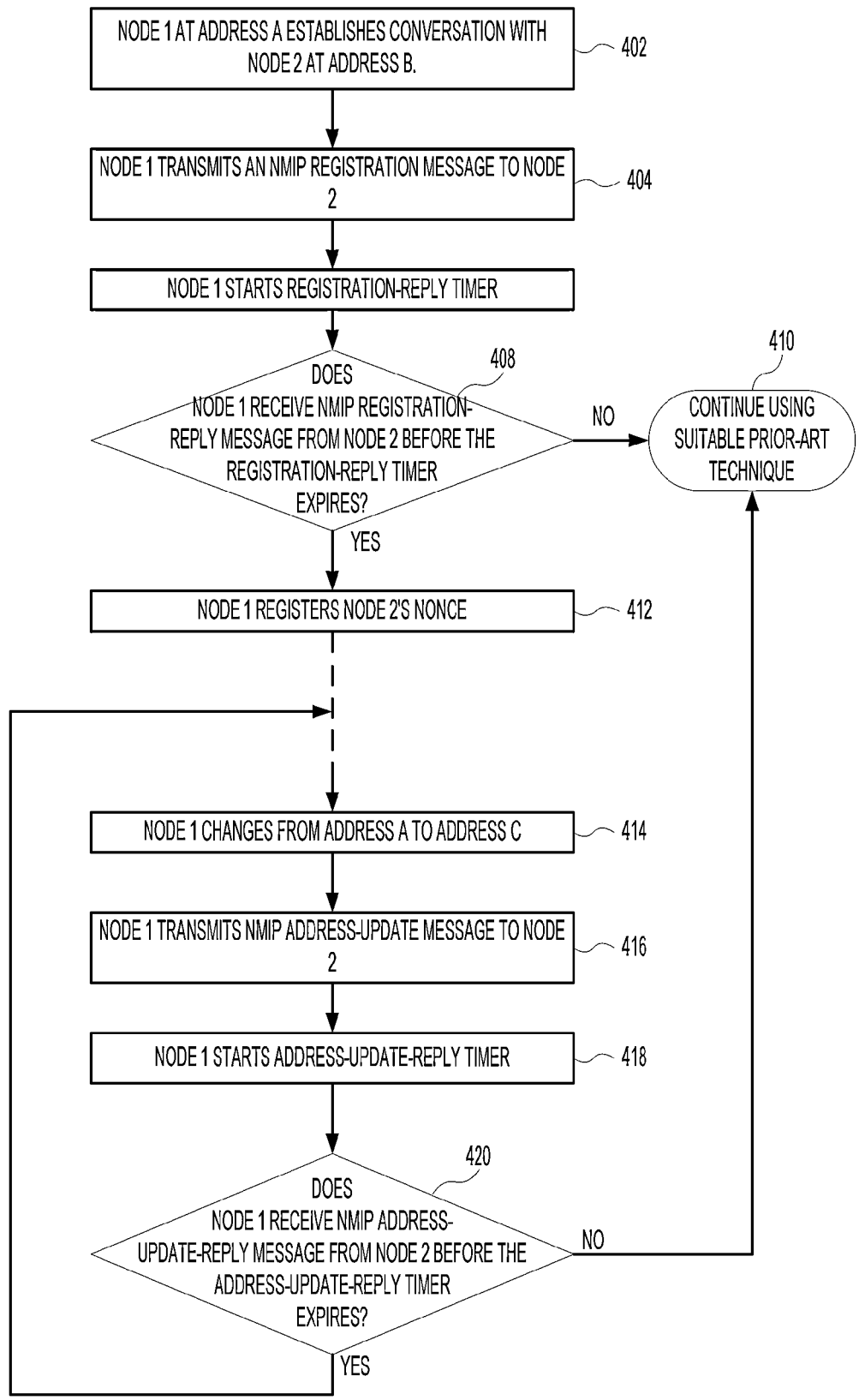
FIG. 4 is a flowchart representing exemplary processing at a first NMIP node (Node 1) associated with an NMIP registration/update process according to one embodiment of the present invention.

An NMIP node can establish an NMIP session only with another NMIP node. A first NMIP node can establish separate, simultaneous NMIP sessions with two or more other NMIP nodes. An NMIP session allows one or both nodes to change IP addresses without interrupting any conversations (i.e., transport-layer and application-layer sessions) established by the nodes. Under certain circumstances, it is possible to combine multiple conversations between a single pair of NMIP nodes into one NMIP session. Two NMIP nodes execute a registration/update process to establish an NMIP session and to update the network addresses associated with the established NMIP session. FIG. 4 is a flowchart representing exemplary processing at a first NMIP node (Node 1) associated with an NMIP registration/update process according to one embodiment of the present invention. In this scenario, NMIP Node 1 a Network Address A establishes a conversation with Node 2 at Network Address B, but Node 1 does not initially know whether or not Node 2 is also an NMIP node. At some point in time, Node 1's network address changes to Network Address C.

At step 402, Node 1 at Network Address A establishes a conversation with Node 2 at Network Address B using a suitable prior-art technique for establishing such conversations.

At step 404, Node 1 transmits an NMIP registration message to Node 2 to attempt to establish an NMIP session with Node 2. The NMIP registration message contains (i) a nonce identifying Node 1 and (ii) a nonce lifetime value for Node 1's nonce.

A nonce chosen by a node is a random number that functions as a unique identifier for the node. The nonce lifetime is a specific duration associated with a nonce, after which the nonce is no longer valid. The term "nonce" was coined by Roger Needham and Michael Schroeder to refer to a value that is "used only once." See R. Needham and M. Schroeder, "Using encryption for authentication in large networks of computers," Communications of the ACM, 21 (12), December 1978, the teachings of which are incorporated herein by reference in their entirety.

A typical NMIP node maintains a locally stored data structure called a session table. When two NMIP nodes establish a new NMIP session, both nodes add a record to their respective session tables. Each session-table record comprises (i) the network address of the other node in the NMIP session, (ii) the nonce of the other node, and (iii) the lifetime of the nonce of the other node. When the NMIP session is terminated by either node or the nonce of the other node expires (i.e., the lifetime has expired), the corresponding record is deleted from the session table.

Nonces are intended to prevent adversaries from hijacking connections. When Node 1 moves from its current network address to a new network address, Node 1 presents proof to its correspondent Node 2 that new packets arriving from the new network address belong to the conversation that started using the other network address.

To do this, Node 1 sends to Node 2 a nonce that conveys the message: "If I change my address, then I'll use the same nonce value as proof that it's still me." To prevent hijacking, (1) Node 1 sends this nonce from its current network address before using the nonce as proof of landing at a new network address, (2) adversaries cannot observe the nonce and cannot, therefore, forge a relocation message to Node 2, and (3) Node 1 uses the nonce after Node 1 has relocated to convince Node 2 that Node 1's address has changed.

If eavesdroppers cannot observe the packets sent between a pair of nodes, then it suffices to use random numbers as nonces with sufficient entropy that the probability of an adversary guessing the nonce is negligible.

If, on the other hand, the network is such that eavesdroppers may observe packets (or even modify them), then cryptographic means can be used to protect the conversation. Note that such means are almost always necessary in any case, because an adversary can also do damage without the existence of NMIP. Given an encrypted connection, Nodes 1 and 2 can exchange information without worry of eavesdropping, so they can exchange the nonce described above for the purpose explained above.

Node 2 accepts address-update messages from Node 1 only if those updates are accompanied by the correct nonce. This implies that Node 2 can accept address updates from Node 1 only if Node 1 previously established a nonce before updating the address.

For additional security, nonce lifetimes can be associated with the nonce exchange such that a nonce ceases to be valid when the nonce's lifetime expires. This forces correspondents to refresh their nonce lifetimes periodically.

Referring again to FIG. 4, after transmitting the NMIP registration message in step 404, Node 1 starts a registration-reply timer at step 406.

At step 408, Node 1 determines whether an NMIP registration-reply message is received from Node 2 before the registration-reply timer expires. If not, Node 1 determines that there will be no NMIP session with Node 2 for the current conversation. In that case, Node 1 continues its processing using a suitable prior-art technique, such as MIP, as reflected in step 410.

Otherwise, Node 1 receives the NMIP registration-reply message from Node 2 in time, and Node 1 determines that there will be an NMIP session with Node 2 for the current conversation. There are two different types of NMIP sessions: one type in which either or both nodes can change their network addresses without interrupting the corresponding conversation(s) and a second type in which only one node can change its network address without causing an interruption. In the scenario depicted in FIG. 4, it is assumed that either or both nodes can change their network addresses. In that case, the NMIP registration-reply message received from Node 2 will contain (i) a nonce identifying Node 2 and (ii) a nonce lifetime value for Node 2's nonce. As such, at step 412, Node 1 registers Node 2's nonce by creating a session-table record correlating Node 2's address, nonce, and nonce lifetime. Note that, in the other type of NMIP session, where Node 2 knows that its network address will not change, a nonce does not have to be established for Node 2, and step 412 is omitted.

At some point in time, Node 1's network address changes from Network Address A to Network Address C, as reflected in step 414. This address change may result, for example, from Node 1 physically moving from one access network to another, as depicted in FIG. 2, or from a reconfiguration of Node 1's current access network without Node 1 physically moving anywhere.

In response to its new network address, Node 1 transmits an NMIP address-update message to Node 2 at step 416. The NMIP address-update message contains (i) Node 1's nonce, (ii) Node 1's old Network Address A, and (iii) Node 1's new Network Address C.

At step 418, Node 1 starts an address-update-reply timer.

At step 420, Node 1 determines whether an NMIP address-update-reply message is received from Node 2 addressed to Node 1's new network address before the address-update-reply timer expires. If not, Node 1 determines that, for some reason, Node 2 is not able to handle the address change under the existing NMIP session. In that case, Node 1 continues its processing using a suitable prior-art technique, such as MIP, as reflected in step 410.

Otherwise, Node 1 receives the correct NMIP address-update-reply message from Node 2 in time, and Node 1 determines that Node 2 was able to handle the address change under the existing NMIP session. In that case, processing returns to step 414 to await another address change by Node 1.

Although not shown in FIG. 4, Node 1 runs two different nonce-expiration timers: one for its own nonce and one for Node 2's nonce. Prior to the expiration of the timer for its own nonce, Node 1 transmits to Node 2 an NMIP nonce-lifetime update message containing a new nonce lifetime value, and Node 1 resets that nonce-expiration timer based on the new nonce lifetime value. For Node 2's nonce, if Node 1 receives an NMIP nonce-lifetime update message from Node 2 before the expiration of the nonce-expiration timer for Node 2's nonce, then Node 1 resets that nonce-expiration timer based on the new nonce lifetime value contained in that update message. If the nonce-expiration timer for Node 2's nonce expires before Node 1 receives an NMIP nonce-lifetime update message from Node 2, then Node 1 "un-registers" Node 2's nonce by deleting the corresponding record from its session table.

If Node 2 is not an NMIP node whose address might change (e.g., Node 2 is an NMIP node whose address is known not to change), then Node 2 does not need to establish its own nonce. In that case, Node 1 needs to run only one nonce-expiration timer—for Node 1's nonce.

Figure 5:
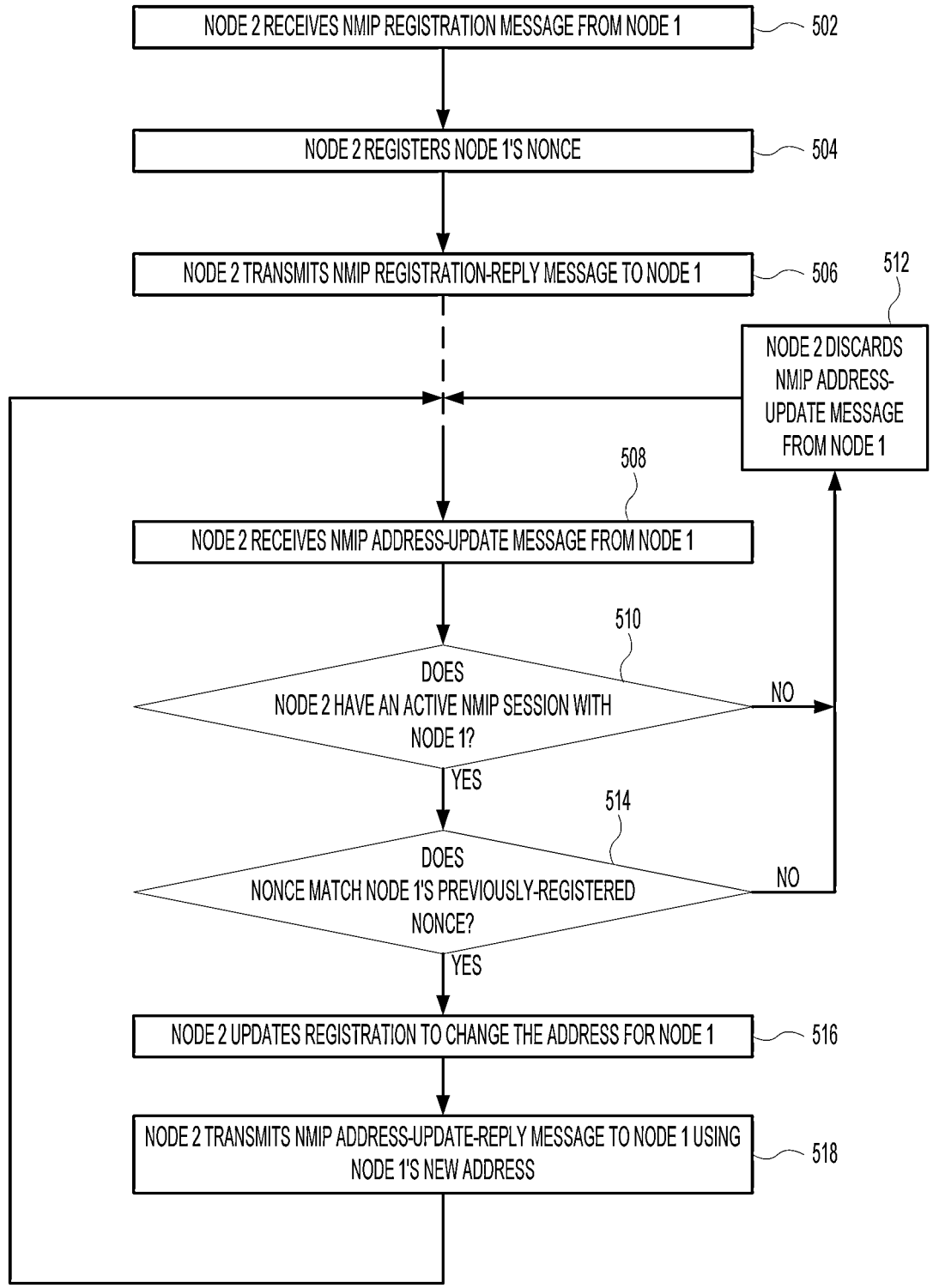
FIG. 5 is a flowchart representing exemplary processing at a second NMIP node (Node 2) corresponding to the NMIP registration/update processing of Node 1 depicted in FIG. 4.

FIG. 5 is a flowchart representing exemplary processing at Node 2 corresponding to the NMIP registration/update processing of Node 1 depicted in FIG. 4.

In step 502, Node 2 receives the NMIP registration message transmitted from Node 1 in step 404 of FIG. 4. In response, at step 504, Node 2 registers Node 1's nonce by creating a session-table record correlating Node 1's address, nonce, and nonce lifetime. At step 506, Node 2 transmits to Node 1 the NMIP registration-reply message referred to in step 406 of FIG. 4.

At some point in time, at step 508, Node 2 receives the NMIP address-update message transmitted from Node 1 in step 416 of FIG. 4.

Using Node 1's old network address indicated in the NMIP address-update message, in step 510, Node 2 determines whether there is an active NMIP session with Node 1. If not, then, in step 512, Node 2 discards the NMIP address-update message from Node 1 and processing returns to step 508 to await receipt of another NMIP address-update message from Node 1.

If Node 2 determines that there is an active NMIP session with Node 1 in step 510, then processing continues to step 514, where Node 2 determines whether the nonce for Node 1 indicated in the NMIP address-update message matches Node 1's previously registered nonce stored in Node 2's session table. If not, the processing continues to step 512 as described above. Otherwise, the nonces match, and, in step 516, Node 2 updates the registration of this NMIP session in its corresponding session table record to reflect Node 1's new network address.

In step 518, using Node 1's new address, Node 2 transmits to Node 1 the NMIP address-update-reply message referred to in step 420 of FIG. 4, and processing returns to step 508 to await receipt of another NMIP address-update message from Node 1.

Until Node 2 receives another NMIP address-update message from Node 1, Node 2 will transmit all packets to Node 1 using Node 1's new network address. Any applications running on Node 2 that had been addressing packets to Node 1 using Node 1's old network address will address subsequent packets using Node 1's new network address.

Although not shown in FIG. 5, like Node 1, when Node 2 is an NMIP node whose address might change, Node 2 also runs two different nonce-expiration timers: one for its own nonce and one for Node 1's nonce. Prior to the expiration of the nonce-expiration timer for its own nonce, Node 2 transmits to Node 1 an NMIP nonce-lifetime update message containing a new nonce lifetime value, and Node 2 resets that nonce-expiration timer based on the new nonce lifetime value. For Node 1's nonce, if Node 2 receives an NMIP nonce-lifetime update message from Node 1 before the nonce-expiration timer for Node 1's nonce expires, then Node 2 resets that nonce-expiration timer based on the new nonce lifetime value contained in that update message. If the nonce-expiration timer for Node 1's nonce expires before Node 2 receives an NMIP nonce-lifetime update message from Node 1, then Node 2 "un-registers" Node 1's nonce by deleting the corresponding record from its session table.

If Node 2 is not an NMIP node whose address might change (e.g., Node 2 is an NMIP node whose address is known not to change), then Node 2 does not need to establish its own nonce. In that case, Node 2 needs to run only one nonce-expiration timer—for Node 1's nonce.

If an NMIP node changes its network address, then there is the possibility that a correspondent node will send packets to the node's old network address in the duration between (i) the time that the node discards its old network address and (ii) the time that the correspondent node updates its processing for the new network address. Typically, such in-transition packets will be few in number. The handling of in-transition packets is discussed below.

NMIP Router

An NMIP mobility router maintains a routing table. When the NMIP mobility router assigns an IP address to a node, the NMIP mobility router adds a record to the routing table that associates the IP address with the link-layer address (e.g., MAC address) of the node. When an NMIP node moves from a first mobility router to a second mobility router and acquires a new IP address from the second mobility router, the node typically sends an address-update message containing the node's new IP address to the first mobility router. The address-update message comprises the nodes new IP address, nonce, and nonce lifetime.

When a node A moves out of a network X having an NMIP router to a network Y, the NMIP router in network X has three main tasks:

(1) Forward any traffic for node A (e.g., in-transit packets or packets sent by a node that does not understand NMIP) that arrives in network X to node A's new address in network Y;
(2) Forward any traffic from node A in network Y to nodes that do not understand NMIP so it appears as if those packets still come from the old address; and
(3) Make sure that no new node obtains node As old address until all conversations making use of the old address have stopped.

Tasks (1) and (2) provide backward compatibility. Task 1 is also useful to streamline (prevent packet loss) mobility for connections that do understand NMIP. Task 3 is important to prevent another type of possible hijacking, namely that of adversaries trying to grab node As old address after node As move in order to fool node As correspondent into believing the connection has not moved.

Figure 6:
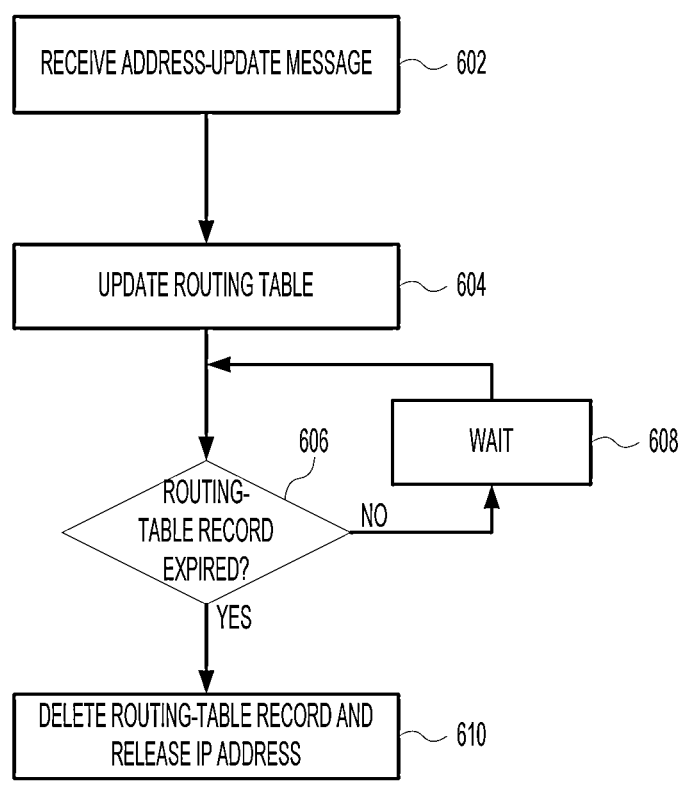
FIG. 6 is a flowchart of address-update process 600 performed by an NMIP mobility router according to various embodiments of the present invention.

FIG. 6 is a flowchart of address-update process 600 performed by an NMIP mobility router according to various embodiments of the present invention. At step 602, the NMIP mobility router receives an address-update message from a node.

At step 604, the NMIP mobility router modifies the routing-table entry associated with the node such that the NMIP mobility router will forward received, in-transition packets bearing a destination address of the node's old IP address to the node's new IP address.

At step 606, the NMIP mobility router determines whether the routing-table record has expired, i.e., the nonce lifetime has expired. If the routing-table record has not expired, then the NMIP mobility router waits a certain amount of time (step 608) and then loops back to step 606. If, instead, the record has expired, then, at step 610, the NMIP mobility router deletes the routing-table record and releases the IP address for possible re-assignment to another node. The NMIP mobility router will now discard any packets addressed to the node's old address. Note that the node can keep the NMIP mobility router from deleting the record by sending repeated update-address messages that contained updated lifetime values.

Backwards Compatibility

As described in the discussion of FIG. 4, if a first NMIP node sends an address-update message to a second node and does not receive an address-reply message before the address-update-reply timer expires, then the first node assumes that the second node is a non-NMIP node. In that case, the second node cannot interpret NMIP address-update messages, and will continue to send packets to the first node's old IP address, i.e., to the first node's old mobility router. Therefore, the first node will periodically send address-update messages to the old mobility router updating the nonce lifetime. Viewed another way, the first node is causing the old NMIP mobility router to behave like an MIP home agent.

Where the old mobility router is a non-NMIP router, at worst, in-transition packets are lost. Transport-layer protocols such as Terminal Control Protocol (TCP) and Stream Control Transmission Protocol (SCTP) can recover the lost in-transition packets.

NMIP Security

In the exemplary embodiment described above, correspondent nodes exchange nonces in the clear at the initiation of an NMIP session. The exemplary embodiment assumes that the network is trusted, i.e., it is impossible to eavesdrop on the address-update messages. Otherwise, an adversary might simply eavesdrop on the address-update messages and copy the nonces from the messages. Then the adversary could send address-update messages instructing another node to redirect traffic to another, incorrect IP address, i.e., hijack the conversation.

Other embodiments of the present invention do not presume a trusted network, and rely on other mechanisms to protect the nonces from eavesdropping. One of those mechanisms is Internet Protocol Security (IPsec), a protocol suite for securing IP communications by authenticating and encrypting each IP packet of the communication. IPsec is defined IETF RFCs 2367, 2401, 2402, 2403, 2404, 2405, 2406, 2407, 2408, 2409, 2410, 2411, 2412, 2451, 2857, 3526, 3602, 3706, 3715, 3775, 3776, 3947, 3948, 4106, 4301, 4302, 4303, 4304, 4306, 4307, 4308, 4309, 4478, 4543, 4555, 4621, 4718, 4806, 4809, 4835, and 4945, all of which are herein incorporated by reference in their entirety.

In yet other embodiments of the present invention, a public key infrastructure (PKI) can be, but does not have to be, utilized to authenticate communications between NMIP nodes.

Although the present invention has been described in the context of typical Ethernet network 200 of FIG. 2, the invention is not so limited. For example, the present invention can be implemented in the context of cellular IP networks having configurations different from that shown in FIG. 2.

Furthermore, although the present invention has been described in the context of a node changing its assigned IP address as a result of moving from one access network to another access network, the present invention is not so limited. For example, the present invention can be implemented in the context of a node that receives a new IP address without moving, e.g., a stationary, wired node changing its IP address in order to resolve an IP-address conflict with another node on the same network.

Although the present invention has been described in the context of IP networks, the invention can be implemented in the context of any other suitable packet-switched network.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A first node for a packet-switched network having a protocol stack comprising an upper layer and a lower layer, the first node comprising:
    a transceiver adapted to receive incoming packets and transmit outgoing packets; and
    a processor adapted to process the incoming packets and generate the outgoing packets, wherein:
        the first node is adapted to establish an upper-layer session with a second node in which packets are transmitted between the first node and the second node via the packet-switched network during which the first node has a first lower-layer address;
        the first node is adapted to switch from the first lower-layer address to a second lower-layer address, different from the first lower-layer address, while maintaining the upper-layer session;
        the first node has a first node's identifier adapted for the second node to use to identify the upper-layer session both (i) when the first node has the first lower-layer address and (ii) when the first node has the second lower-layer address;
        the first node has no home lower-layer address;
        when the first node has the first lower-layer address, packet from the second node are transmitted to the first node via a first router; and
        if the first node not receive an identifier for the second node, then, after the first node switches from the first lower-layer address to the second lower-layer address, the first node transmits one or more messages to the first router to instruct the first router to forward, to the second lower-layer address, a subsequently received packet addressed to the first lower-layer address.

2. The first node of claim 1, wherein the first node has no lower-layer address that remains fixed for the duration of the upper-layer session.

3. The first node of claim 1, wherein no router in the packet-switched network is a home agent for the first node.

4. The first node of claim 1, wherein having no home lower-layer address means that no permanent lower-level address is assigned to the first node.

5. The first node of claim 1, wherein:
    the upper layer is a transport layer or an application layer; and
    the lower layer is a network layer.

6. The first node of claim 1, wherein the first node's identifier is a nonce selected by the first node.

7. The first node of claim 1, wherein the first router forwards the subsequently received packet by encapsulating the subsequently received packet in another packet having the second lower-layer address.

8. The first node of claim 1, wherein the first node transmits the first node's identifier to the second node using key-based secure communications.

9. The first node of claim 1, wherein the first node transmits, to the second node, a lifetime for the first node's identifier.

10. The first node of claim 9, wherein the first node subsequently transmits, to the second node, an updated lifetime for the first node's identifier.

11. The first node of claim 1, wherein:
    the second node has an identifier; and
    the first node associates the second node's identifier with a current lower-layer address of the second node, such that the first node addresses current packets to be transmitted to the second node with the current lower-layer address of the second node.

12. The first node of claim 11, wherein the second node's identifier is a nonce selected by the second node.

13. The first node of claim 11, wherein, when the second node changes from the current lower-layer address to a subsequent lower-layer address, the first node associates the second node's identifier with the subsequent lower-layer address of the second node, such that the first node addresses subsequent packets to be transmitted to the second node with the subsequent lower-layer address of the second node.

14. The first node of claim 11, wherein:
the first node associates the second node's identifier with a specified lifetime for the second node's identifier;
after expiration of the second node's identifier's specified lifetime, the first node ceases to associate the second node's identifier with the current lower-layer address of the second node.

15. The first node of claim 14, wherein:
the first node receives from the second node an updated lifetime for the identifier of the second node; and
the first node associates the second node's identifier with the updated lifetime for the second node's identifier.

* * * * *

UNITED STATES PATENT AND TRADEMARK OFFICE
CERTIFICATE OF CORRECTION

| | | |
|---|---|---|
| PATENT NO. | : 8,451,840 B2 | Page 1 of 1 |
| APPLICATION NO. | : 12/612293 | |
| DATED | : May 28, 2013 | |
| INVENTOR(S) | : Peter Bosch et al. | |

It is certified that error appears in the above-identified patent and that said Letters Patent is hereby corrected as shown below:

In the Claims

- In Column 14, Line 27, Claim 1, please replace "packet" with --packets--.

- In Column 14, Line 29, Claim 1, please replace "node not" with --node does not--.

Signed and Sealed this
Thirtieth Day of July, 2013

Teresa Stanek Rea
*Acting Director of the United States Patent and Trademark Office*